(12) United States Patent
Reddy et al.

(10) Patent No.: US 12,355,484 B2
(45) Date of Patent: Jul. 8, 2025

(54) TIME OFFSETS IN ULTRA-WIDEBAND (UWB) RANGING

(71) Applicant: QUALCOMM Incorporated, San Diego, CA (US)

(72) Inventors: Varun Amar Reddy, San Diego, CA (US); Alexandros Manolakos, Escondido, CA (US); Pooria Pakrooh, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 18/057,753

(22) Filed: Nov. 21, 2022

(65) Prior Publication Data
US 2024/0171215 A1    May 23, 2024

(51) Int. Cl.
*H04B 1/7183* (2011.01)
*H04W 12/037* (2021.01)

(52) U.S. Cl.
CPC ........ *H04B 1/7183* (2013.01); *H04W 12/037* (2021.01)

(58) Field of Classification Search
CPC .. H04B 1/7183; H04W 12/037; G01S 13/765; G01S 5/0072; G01S 5/0205; G01S 11/02; H04L 2209/805; H04L 9/001; H04L 9/12
See application file for complete search history.

(56) References Cited

U.S. PATENT DOCUMENTS

| | | | |
|---|---|---|---|
| 10,992,419 B1 * | 4/2021 | Zhou | H04L 1/0618 |
| 2020/0213842 A1 * | 7/2020 | Li | H04W 12/03 |
| 2021/0076350 A1 * | 3/2021 | Yang | G01S 3/50 |
| 2021/0258795 A1 * | 8/2021 | Schober | H04W 12/63 |
| 2022/0137177 A1 * | 5/2022 | Hammerschmidt | G01S 13/003 |
| | | | 455/456.1 |
| 2022/0191700 A1 | 6/2022 | Jung et al. | |
| 2024/0188174 A1 * | 6/2024 | Jung | H04W 76/38 |

FOREIGN PATENT DOCUMENTS

EP    4054114 A1    9/2022

OTHER PUBLICATIONS

International Search Report and Written Opinion—PCT/US2023/076376—ISA/EPO—Feb. 9, 2024.
Singh M., et al., "Security Analysis of IEEE 802.15.4z/HRP UWB Time-of-Flight Distance Measurement", WiSec '21: Proceedings of the 14th ACM Conference on Security and Privacy in Wireless and Mobile Networks, Jun. 2021, 11 pages.

* cited by examiner

*Primary Examiner* — Sam K Ahn
*Assistant Examiner* — Amneet Singh
(74) *Attorney, Agent, or Firm* — Weaver Austin Villeneuve & Sampson LLP/QUALCOMM

(57) ABSTRACT

In some implementations, a first ultra-wideband (UWB) device may determine a respective time offset for each scrambled timestamp sequence (STS) in a series of STS used for ranging in a UWB ranging session between the first UWB device and the second UWB device, wherein the respective time offset for each STS in the series of STS is determined in accordance with time offset information shared between the first UWB device and the second UWB device. The first UWB device may transmit the series of STS via UWB radio frequency (RF) signals during the UWB ranging session, wherein each STS in the series of STS is transmitted with the respective time offset.

24 Claims, 11 Drawing Sheets

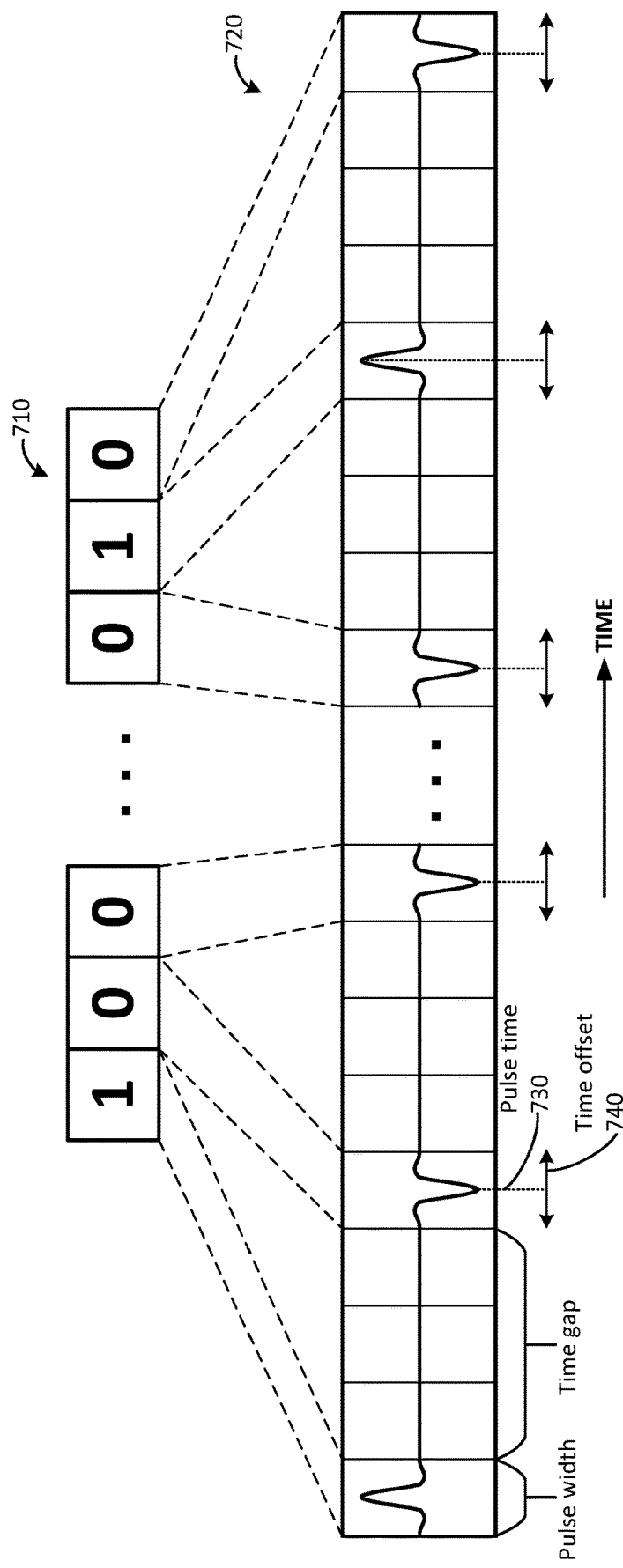

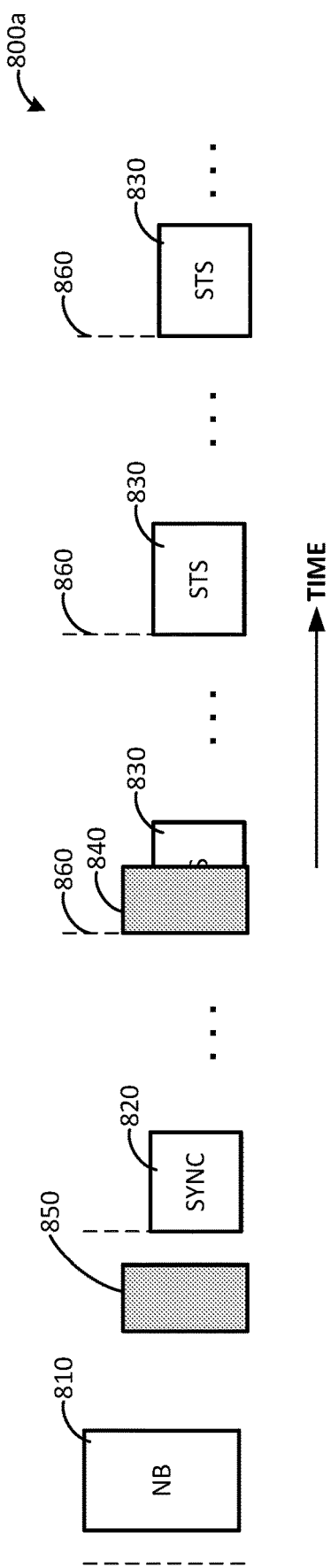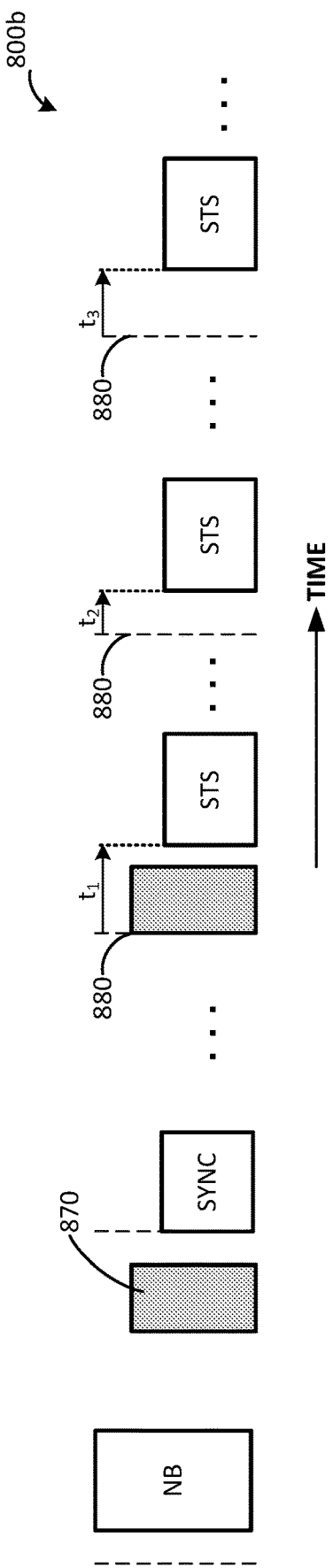
FIG. 8A
FIG. 8B

TIME OFFSETS IN ULTRA-WIDEBAND (UWB) RANGING

BACKGROUND

1. Field of Disclosure

The present disclosure relates generally to the field of radio frequency (RF)-based position determination (or positioning) of an electronic wireless device. More specifically, the present disclosure relates to ultra-wideband (UWB)-based positioning.

2. Description of Related Art

The positioning of devices can have a wide range of consumer, industrial, commercial, military, and other applications. UWB-based ranging (e.g., as defined in IEEE 802.15.4ab and/or other wireless specifications) offers a highly-accurate, low-power positioning solution relative to other RF-based ranging/positioning techniques for wireless electronic devices. Such UWB-based ranging may implement some features to help mitigate the likelihood that RF signals may be illegitimately mimicked (or "spoofed"). But UWB-based positioning may still be vulnerable to such spoofing in some regards.

BRIEF SUMMARY

An example method of enabling secure ultra-wideband (UWB) ranging between a first UWB device and a second UWB device, according to this disclosure, may comprise determining, at the first UWB device, a respective time offset for each scrambled timestamp sequence (STS) in a series of STS used for ranging in a UWB ranging session between the first UWB device and the second UWB device, wherein the respective time offset for each STS in the series of STS is determined in accordance with time offset information shared between the first UWB device and the second UWB device. The method also may comprise transmitting, with the first UWB device, the series of STS via UWB radio frequency (RF) signals during the UWB ranging session, wherein each STS in the series of STS is transmitted with the respective time offset.

An example method of enabling secure ultra-wideband (UWB) ranging between a first UWB device and a second UWB device, according to this disclosure, may comprise determining, at the second UWB device, a respective time offset for each scrambled timestamp sequence (STS) in a series of STS used for ranging in a UWB ranging session between the first UWB device and the second UWB device, wherein the respective time offset for each STS in the series of STS is determined in accordance with time offset information shared between the first UWB device and the second UWB device. The method also may comprise receiving, with the second UWB device, the series of STS via UWB radio frequency (RF) signals during the UWB ranging session, wherein each STS in the series of STS is received with the respective time offset.

An example first ultra-wideband (UWB) device, according to this disclosure, may comprise a transceiver, a memory, one or more processors communicatively coupled with the transceiver and the memory, wherein the one or more processors are configured to determine a respective time offset for each scrambled timestamp sequence (STS) in a series of STS used for ranging in a UWB ranging session between the first UWB device and a second UWB device, wherein the respective time offset for each STS in the series of STS is determined in accordance with time offset information shared between the first UWB device and the second UWB device. The one or more processors further may be configured to transmit, via the transceiver, the series of STS via UWB radio frequency (RF) signals during the UWB ranging session, wherein each STS in the series of STS is transmitted with the respective time offset.

An example second ultra-wideband (UWB) device, according to this disclosure, may comprise a transceiver, a memory, one or more processors communicatively coupled with the transceiver and the memory, wherein the one or more processors are configured to determine a respective time offset for each scrambled timestamp sequence (STS) in a series of STS used for ranging in a UWB ranging session between a first UWB device and the second UWB device, wherein the respective time offset for each STS in the series of STS is determined in accordance with time offset information shared between the first UWB device and the second UWB device. The one or more processors further may be configured to receive, via the transceiver, the series of STS via UWB radio frequency (RF) signals during the UWB ranging session, wherein each STS in the series of STS is received with the respective time offset.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 7 is a timing diagram illustrating how a time offset may be performed at the pulse level, according to an embodiment.

FIG. 8A is a timing diagram illustrating a series of NB UWB packets that may be transmitted by a transmitting UWB device in an NB-assisted ranging session.

FIG. 8B is a timing diagram illustrating a series of NB UWB packets similar to FIG. 8A, but with time offsets, according to an embodiment.

Figure 1A:
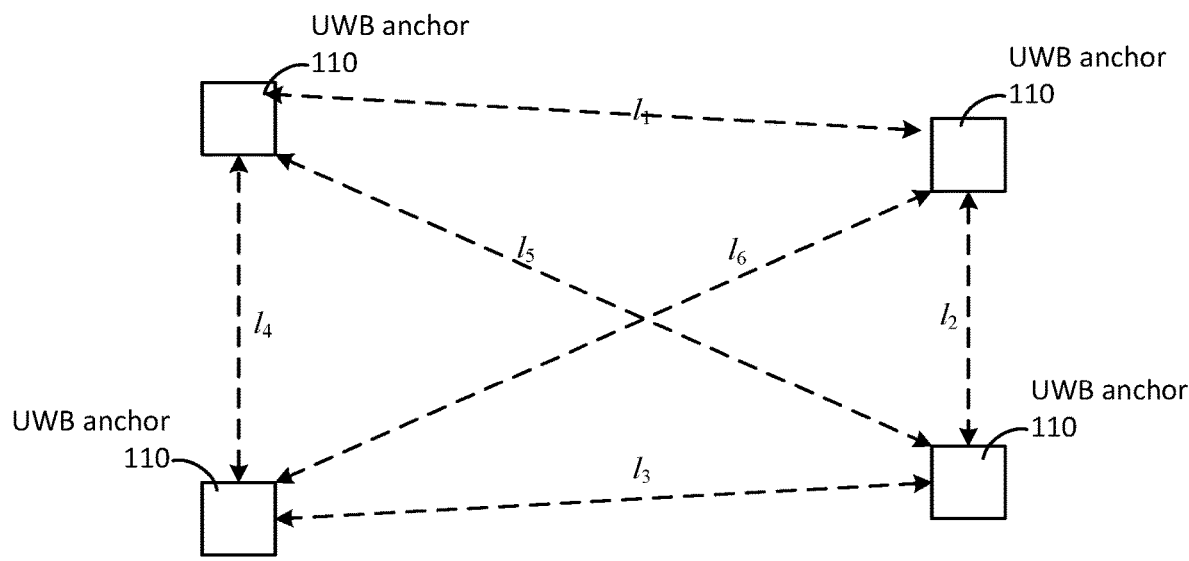
FIGS. 1A and 1B are simplified diagrams illustrating examples of how ultra-wideband (UWB) positioning/ranging may be performed in a network of UWB devices.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave (or waves) that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths, e.g., when a transmitted RF signal reaches a receiver via two or more different spatial paths, e.g., due to reflections.

As previously noted, UWB-based ranging offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system or a wireless network having positioning capabilities (e.g., a cellular network).

Unless otherwise specified, the term "positioning" as used herein (including, for example, UWB-based positioning, cellular-based positioning, satellite-based positioning, and hybrid cellular/UWB positioning) may include absolute location determination, relative location determination, ranging, or a combination thereof. Such positioning may include and/or be based on timing, angular, phase, or power measurements, or a combination thereof (which may include RF sensing measurements) for the purpose of location or sensing services. As used herein, "UWB positioning" and "UWB ranging" may be used interchangeably.

The UWB-based positioning of UWB devices such as IOT devices, mobile phones, etc., may be an important feature for the functionality of the device. Knowledge of a precise position of an IOT device on a factory floor, for example, may be key to ensuring the IOT device operates properly. Positioning for devices such as shipping tags or location tags for items or people (e.g., patients in a hospital) also may be key to the functionality of such devices. Other devices, such as cell phones, may also use UWB-positioning to perform a variety of functions. As such, the stability of such positioning can be important to the overall functionality of these devices. Embodiments herein may utilize time offsets to offset a scrambled timestamp sequence (STS) (e.g., the entire STS and/or pulses thereof) to mitigate or eliminate problems arising from a potential spoofing of UWB ranging signals. Details follow hereafter, after a review of relevant UWB-based ranging/positioning technology.

Figure 1B:
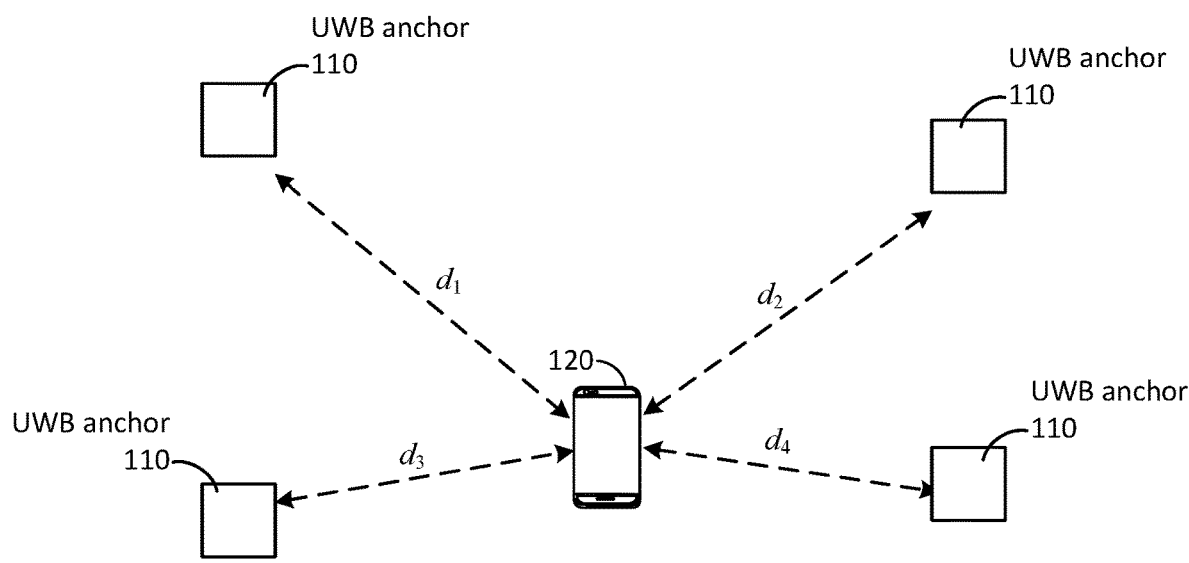

FIGS. 1A and 1B are simplified diagrams illustrating how UWB positioning may be performed in a network (e.g., ad-hoc network) of UWB anchors 110. As referred to herein, "UWB anchors" (or simply "anchors") may comprise UWB devices with known locations that can be used to determine the position of a target 120, or "tag," using UWB RF signals. UWB positioning may be performed utilizing relevant standards (e.g., IEEE 802.15.4ab), which enable high-accuracy, low power positioning.

If the position of one or more UWB anchors 110 is not yet known, such as in an ad-hoc network, an initial provisioning of the UWB anchors 110 may be performed. In the provisioning, UWB anchors 110 may perform ranging measurements to determine relative distances (11-16) between UWB devices 110, as illustrated in FIG. 1A. This can enable the UWB anchors 110 to determine the relative locations with one another and, if the absolute location of any UWB anchor 110 is known, the absolute locations (e.g., with respect to a coordinates system). Once the positions of the UWB anchors 110 is known, the determination of location of a target 120 can be made by determining the distances (d1-d6) between the UWB anchors 110 and target 120. These distances can be determined using a variety of positioning-related measurements and/or procedures. This can include, for example, Reference Signal Time Difference (RSTD), Time of Arrival (ToA), two-way ranging (TWR) (e.g., including single-sided TWR (SS-TWR) and/or double-sided TWR (DS-TWR)), Time Difference of Arrival (TDoA), and more. Additionally or alternatively, angle-based measurements may be made for positioning of the target 120, including angle of arrival (AoA) and/or Angle of departure (AoD).

UWB anchors 110 may vary in form and function. In some embodiments, for example, a UWB anchor 110 may comprise a mobile device such as a mobile phone with UWB functionality. Similarly, anchors 110 may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB anchors 110 may also comprise proprietary and/or dedicated RF beacons deployed at known locations for monitoring the location of tags or devices used in logistical applications. This can be done, for example, to track packages, shipping containers, or the like. UWB anchors 110 may be used in proximity applications to, for example, unlock the door as a user (e.g., an authorized user) approaches. UWB anchors 110 may also be deployed in a factory setting to monitor robots, assembled parts, or the like. UWB anchors 110 may also be used in other applications and/or device types.

A group of UWB anchors 110 may conduct sessions in which UWB anchors 110 perform a series of operations to determine the position of one or more of the devices, and during which the UWB anchors 110 engage in direct communications (e.g., D2D communications) to coordinate the exchange of data, synchronize (e.g., for TDoA positioning). (As used herein, a "session" between devices may comprise a coordinated series of operations conducted by the devices to perform a task, such as ranging or positioning. Different types of sessions may include different operations. A session may be conducted in accordance with a relevant standard, may be identified with a session ID, may be conducted in parallel with other tasks (e.g., other sessions), or any combination thereof. As referred to herein, a "UWB session" may refer to a session used for UWB ranging and/or positioning.) A group of UWB anchors 110 may be called a "cluster," and a network of UWB devices may comprise multiple clusters. Each cluster may include any number of UWB anchors 110, and different clusters may overlap, such that one or more UWB anchors 110 may be a part of one or more different clusters.

Figure 2A:
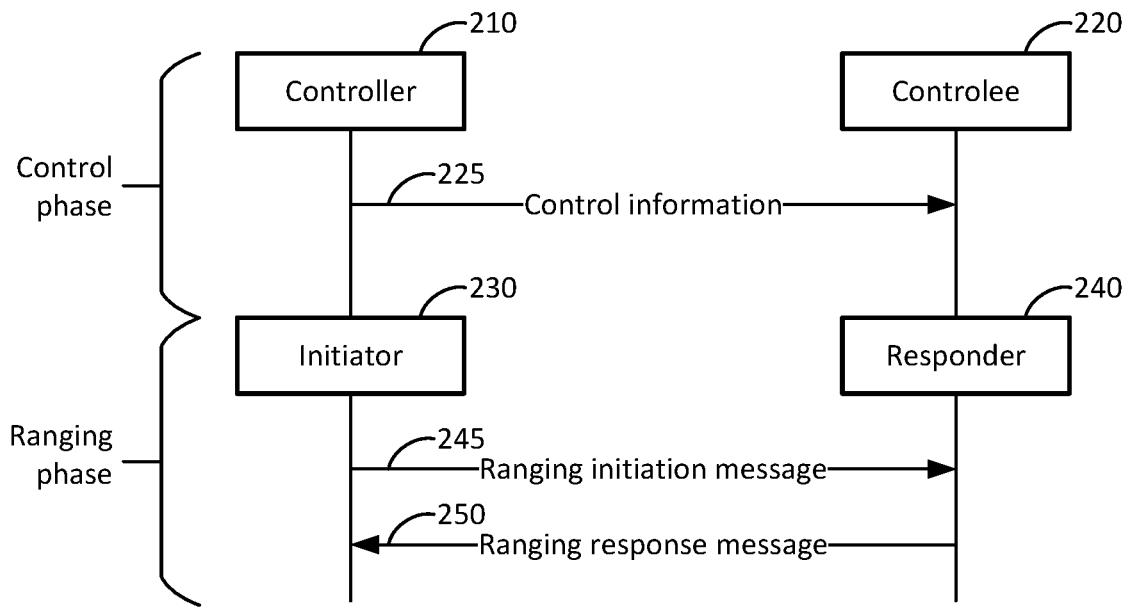
FIGS. 2A and 2B are a flow diagram illustrating the roles different UWB devices may assume with regard to a UWB ranging session, which comprises a control phase and a ranging phase.

FIG. 2A is a flow diagram illustrating the roles different devices may assume with regard to a UWB ranging session (or simply a "UWB session"), which may be conducted in accordance with a relevant UWB positioning standard (e.g., IEEE 802.15.4ab). Here, each UWB device may be referred to as an enhanced ranging device (ERDEV). ERDEVs may be referred to different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs).

As indicated, for a pair of ERDEVs communicating with each other, the controller 210 is an ERDEV that sends control information 225 to a receiving ERDEV, designated as the controlee 220. The control information 225 may include parameters for the UWB ranging session, such as timing, channel, etc. Although not illustrated, the controlee 220 can send acknowledgment to the control information 225, may negotiate changes to the parameters, and/or the like.

The exchange between controller 210 and controlee 220, including the sending of the control information 225 and subsequent related exchanges between controller 210 and controlee 220 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 210 and controlee 220 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round). Accordingly, some aspects of the control phase may be considered to occur in band, subsequent to the preliminary OOB exchange between the controller 210 and controlee 220.)

The UWB session may occur afterward, in accordance with the parameters provided in the control information. In the ranging phase of the UWB session, one ERDEV may take the role of an initiator 230 and the other ERDEV may take the role of a responder 240. As indicated in FIG. 2A, the initiator 230 may initiate UWB ranging by sending a ranging initiation message 245 to the responder 240, to which the responder 240 may reply with a ranging response message 250, and timing measurements may be made of these messages (by the devices receiving the messages) to perform two-way ranging (TWR). Depending on the parameters of the control information 225, additional exchanges may be made in the ranging phase between the initiator 230 and responder 240 to allow for additional ranging measurements.

Figure 2B:
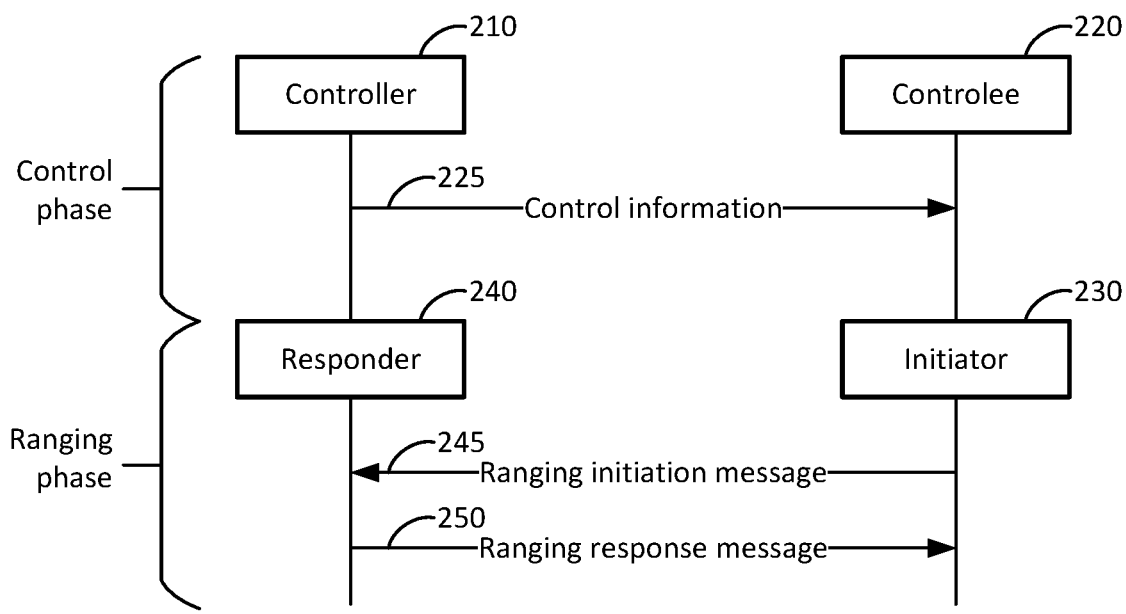

The roles of initiator 230 and responder 240 may be indicated in the control information 225. Further, as indicated in FIG. 2A, the controller 210 in the control phase may be the initiator 230 in the ranging phase of the UWB session. Alternatively, as indicated in FIG. 2B, the controller 210 in the control phase may be the responder 240 in the ranging phase. The determination of which device is initiator 230 and which is responder 240 may depend on the parameters set forth in the control information 225, in which case the controlee 220 correspondingly becomes either the responder 240 or the initiator 230. According to some embodiments, a controller/initiator may conduct ranging with multiple controlees/responders.

Figure 3:
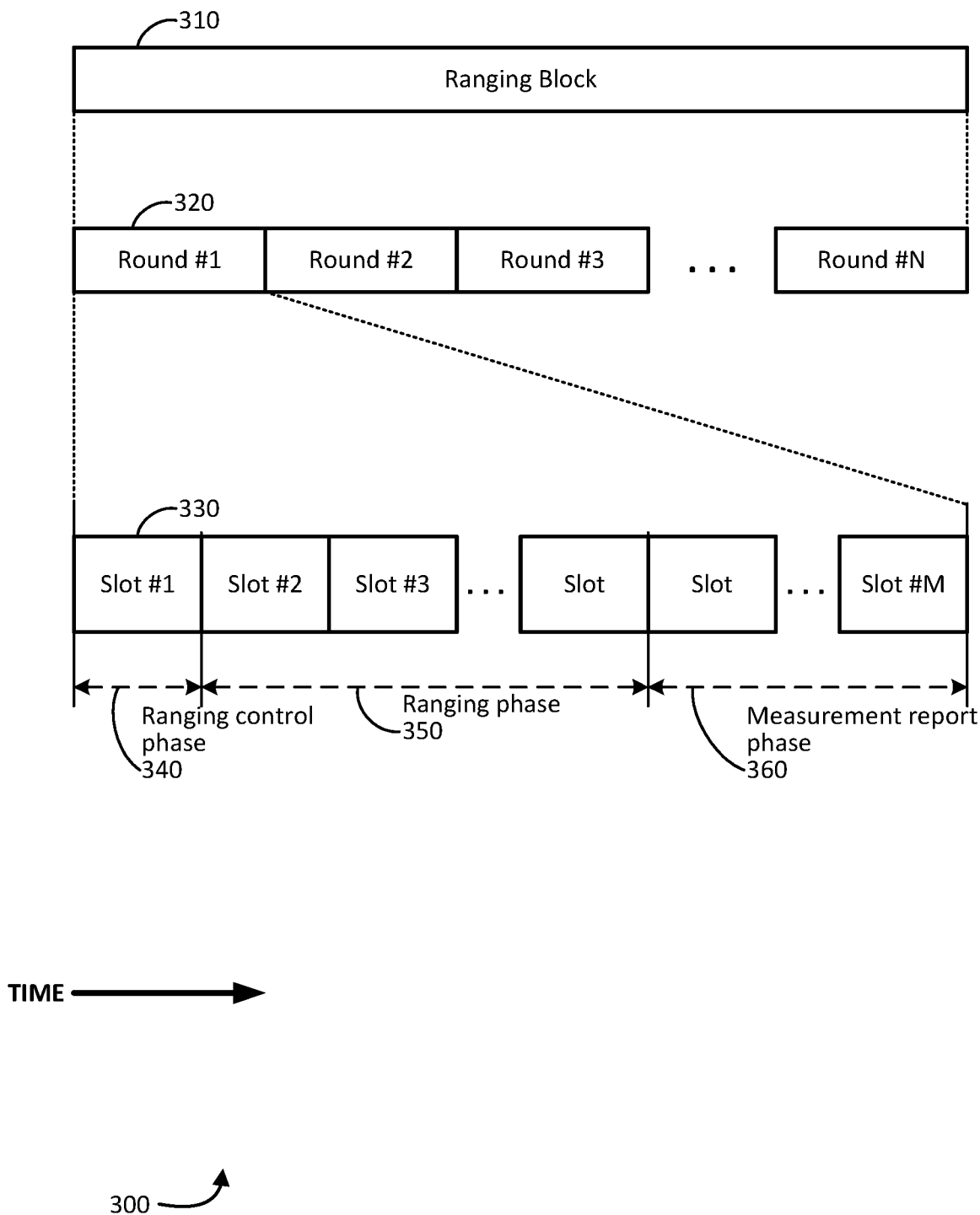
FIG. 3 is a timing diagram of how time may be measured and utilized within a UWB ranging session.

FIG. 3 is a diagram 300 illustrating how time may be segmented and utilized within a UWB ranging session, which may be used in some embodiments. A UWB session may occur over a period of time divided into sub-portions according to a hierarchical structure. This timing comprises one or more consecutive ranging blocks 310, which may have a configurable duration (e.g., 200 ms). (For simplicity, only one ranging block 310 is shown in FIG. 3. However, a UWB session may utilize multiple ranging blocks, which may occur in succession.) Each ranging block 310 may be split into one or more successive rounds 320 (e.g., N rounds). The number and length of the rounds may be configurable. The rounds 320 may be further split into different slots 330, which also may have a configurable number and length. According to some embodiments, to help reduce RF collisions, each cluster of UWB anchors may use a single round in each ranging block 310 for UWB positioning. Neighboring clusters may utilize different rounds.

The slots within a round 320 may be allocated for different purposes. For example, the initial slot may be dedicated as the ranging control phase 340, in which an initiator UWB anchor for the cluster, or Init-Anchor, transmits control information for the other UWB anchors in the cluster. This information can include, for example, an allocation of slots among the different UWB anchors of the cluster. During the subsequent ranging phase 350, the different UWB anchors may transmit in accordance with the allocated slot. That is, each anchor may be allocated a corresponding slot in the ranging phase 350 to transmit one or more ranging signals. The ranging phase 350 may be followed by a measurement report phase 360 in which UWB anchors in a cluster may report measurements (e.g., of signals measured during the ranging phase 350).

Figure 4A:
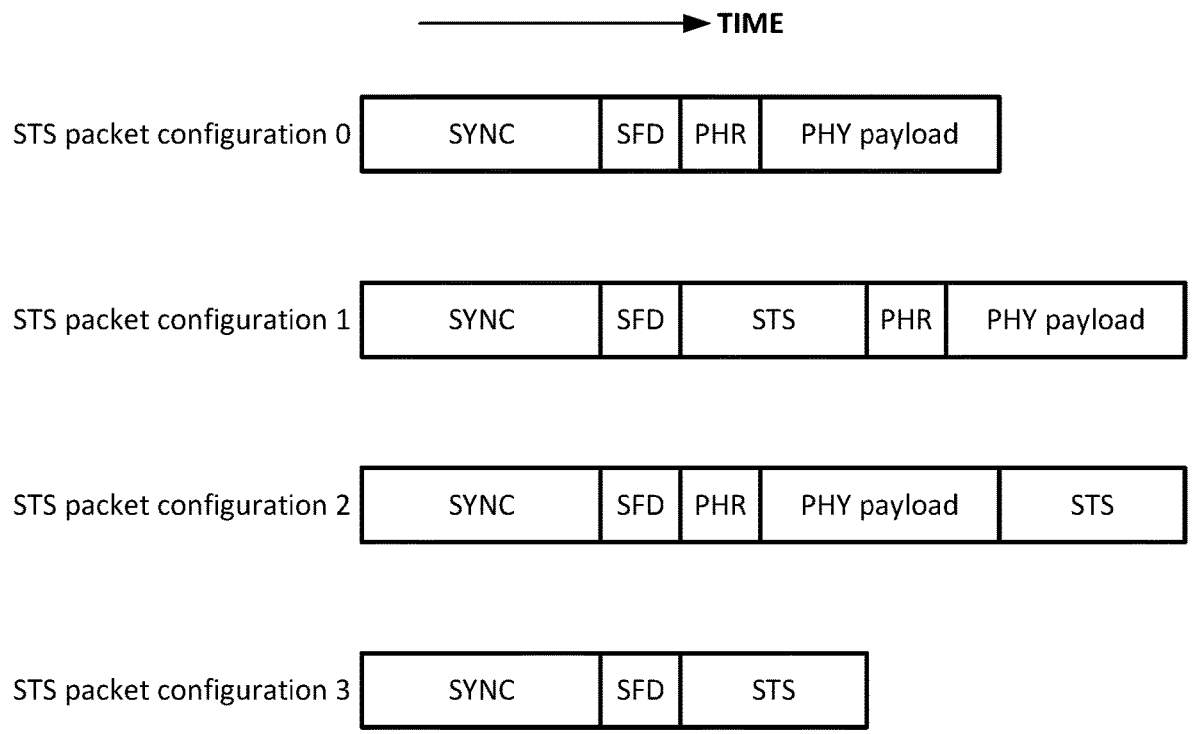
FIG. 4A is illustration of different packet configurations that can be used in a UWB session at the UWB physical (PHY) layer.

FIG. 4A is an illustration of different packet configurations that can be used in a UWB session at the UWB physical (PHY) layer, which may be used in some embodiments. These packet configurations may be defined and/or used in relevant UWB standards (e.g., IEEE 802.15.4z). As shown, ranging functionality may be based on channel estimation using the SYNC preamble, included in each of the for possible configurations (e.g., configurations 0-3) used in current configurations. (Configuration 0 is currently used as a default configuration.) The SYNC preamble may comprise a bit sequence (such as a Ipatov ternary sequence, Gold sequence, Golay sequence, polyphase sequence like Zadoff-Chu sequence, etc.) that exhibits good autocorrelation properties (e.g., sufficient for ranging measurements). As illustrated, the different packet configurations may also include a start of frame delimiter (SFD) to help demarcated the SYNC preamble from the rest of the packet, a PHY payload for conveying data (e.g., for communication, time stamp information, etc.), and/or a scrambled timestamp sequence (STS). The STS is a security feature with a unique sequence known to transmitter and receiver, which can authenticate the data packet source and help prevent illegitimate over-the-air RF signals (spoofing signals) that can falsify a ToA estimate for ranging in a UWB session. This aspect of UWB ranging is described in more detail with regard to FIG. 4B.

Figure 4B:
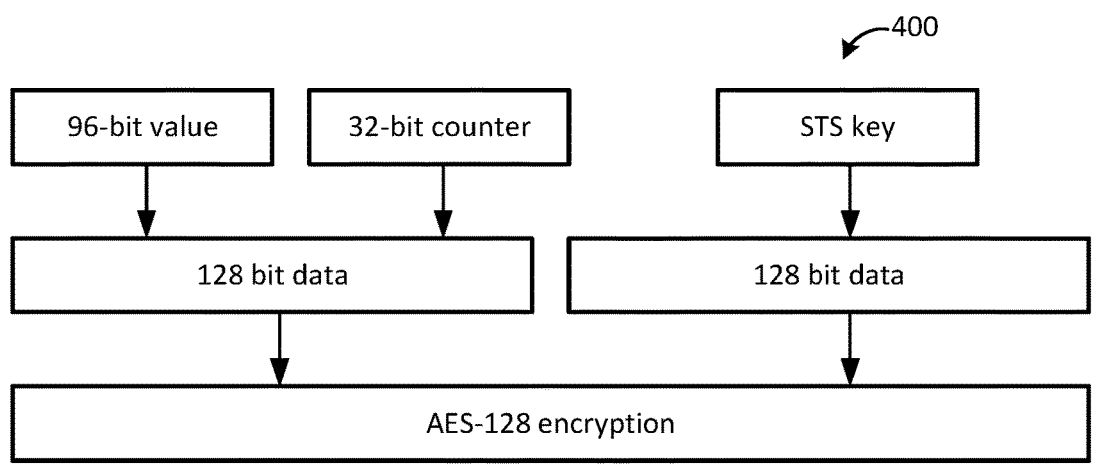
FIG. 4B is an illustration of a deterministic random bit generator (DRBG) that can be used to generate an scrambled timestamp sequence (STS).

FIG. 4B is an illustration of a deterministic random bit generator (DRBG) 400 that can be used to generate an STS, which may be used in some embodiments. Here, the DRBG 400 is based on Advanced Encryption Standard (AES)-128 in counter mode. As illustrated, the DRBG 400 uses a 96-bit value, a 32-bit counter, and an STS key. The STS key may be exchanged securely between ERDEVs (e.g., an initiator and one or more responders) prior to the UWB session. For example, an STS key may be provided by the controller (e.g., controller 210 of FIG. 2A or 2B), for example, at the application layer over a secure link (e.g., an OOB link).

Despite security measures provided by STS, STS is not used in all STS packet configurations (e.g., STS packet configuration 0). Even if STS is present, ranging utilizing STS may still be vulnerable to potential spoofing. Example ways in which STS packet configurations may be spoofed are provided in Singh, Mridula, et al. "Security analysis of IEEE 802.15.4z/HRP UWB time-of-flight distance measurement." *Proceedings of the 14th ACM Conference on Security and Privacy in Wireless and Mobile Networks*. 2021. In brief, an spoofer can randomly generate pulses that overlap the legitimate STS transmission, which leads to higher sidelobes after correlation at the receiving UWB device, which may cause the receiving UWB device to mistake the sidelobe as a legitimate signal. In scenarios in which signals travel via multipath or non-line of sight (NLOS) channels, the authors have shown success in hampering the performance of ToA estimation (even after using the STS) by using "Cicada++" and "Adaptive Injection" spoofing. Additional information regarding these types of RF spoofing is provided hereafter with respect to FIG. 5.

Figure 5:
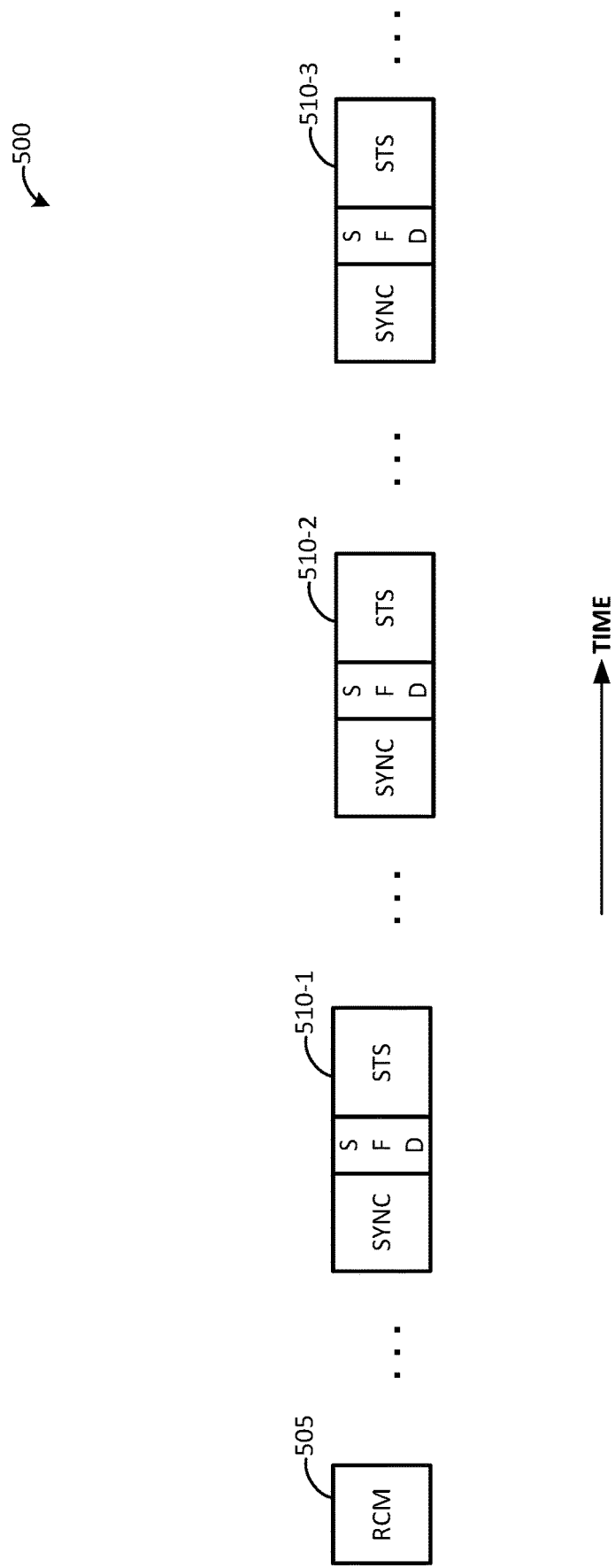
FIG. 5 is a timing diagram illustrating the transmission of a series of STS packets for UWB ranging.

FIG. 5 is a timing diagram illustrating the transmission of a series 500 of STS packets for UWB ranging, which may be transmitted in a UWB ranging session between two UWB devices. As illustrated, the series 500 comprises a ranging control message (RCM) 505 followed by a series of STS packets. As previously described, the RCM 505 may be transmitted during the first slot in a round (e.g., round 320 as described with respect to FIG. 3), and each STS packet may be transmitted in subsequent slots. It can be noted that although the series 500 includes packets having STS packet configuration three, the principles described respect to FIG. 5 and subsequent figures may apply to other STS packet configurations. Further, alternative scenarios may include a larger or smaller number of STS packets in the series, depending on desired functionality.

Despite having STS 510-1, 510-2, and 510-3 (collectively and generically referred to herein as STS 510), which is a sequence unknown to an spoofer, an spoofer may still determine when STS 510 is transmitted (e.g., based on unsecure synchronization packets) and transmit signals that interrupt the receipt of the STS 510 at a receiving device, which may cause the receiving device to determine an incorrect ToA of the STS 510. (Specifically, this may comprise distance-reduction spoofing in which a sidelobe resulting from the spoofing is mistaken for an early legitimate signal.) This, in turn, can result in an incorrect position determination of the receiving and/or transmitting UWB device, which may compromise the safety of the UWB device(s). In Cicada++ spoofing, an spoofer may inject pulses at a fraction of the repetition frequency of the STS, where each injected pulse is stronger than the legitimate pulse. In Adaptive Injection spoofing, the spoofer may perform a similar pulse injection as Cicada++, but may further stop transmitting the injected pulses when it observes the correlation by a receiving UWB device has already been affected.

Figure 6:
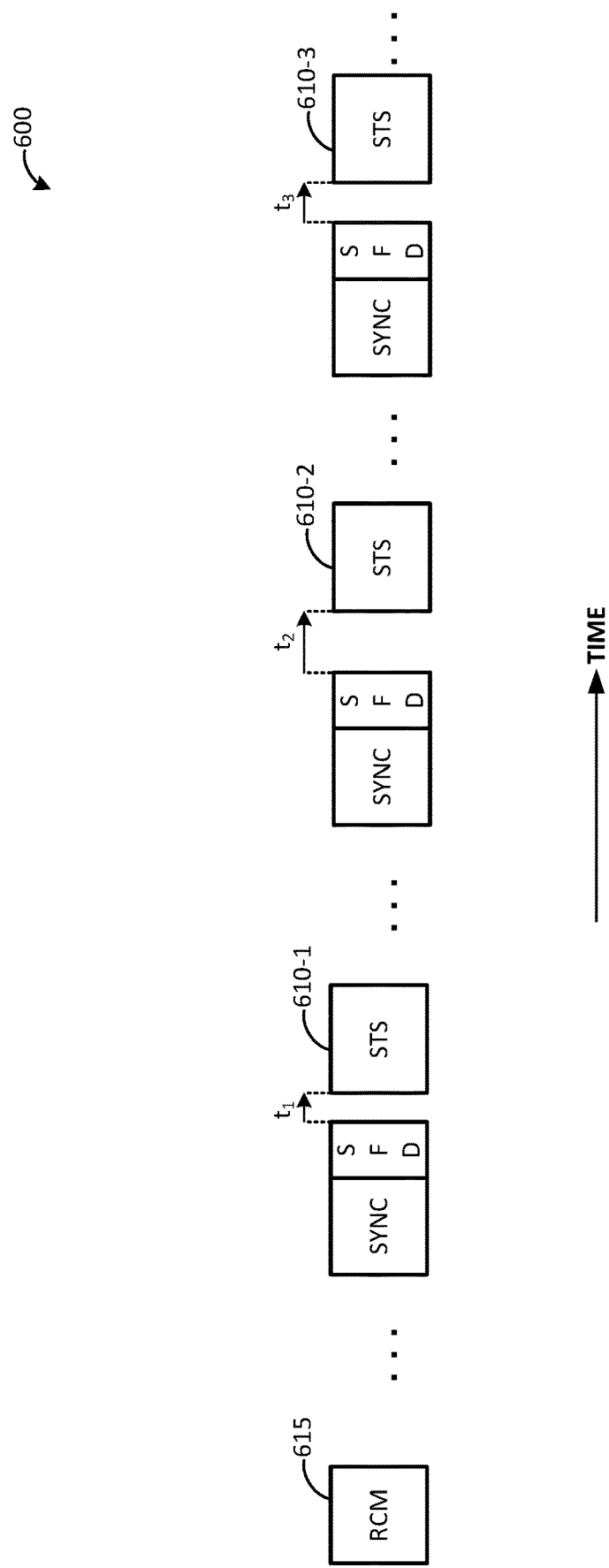
FIG. 6 is a timing diagram similar to the diagram of FIG. 5, but where each STS has a time offset, according to an embodiment.

Embodiments herein can help mitigate issues arising from these and similar types of spoofing by transmitting the STS 510 with a time offset, as illustrated in FIG. 6.

FIG. 6 is a timing diagram similar to the diagram of FIG. 5. Here, however, each STS has a time offset. Specifically, the first STS 610-1 has a first offset, $t_1$, the second STS 610-2 has a first offset, $t_2$, and the third STS 610-3 has a first offset, $t_3$. As illustrated, this time offset may offset the STS from the rest of the STS packet. With the inclusion of a time offset, the STS may be transmitted at a time unknown to a spoofer, thereby preventing the spoofer from superimposing its own fraudulent transmission on the legitimate STS.

The time offset may be a pseudo-random offset shared between the transmitting and receiving UWB devices such that an spoofer is unable to determine when STS are transmitted. A controller UWB device (e.g., the transmitting UWB device), for example, may share time offset information with a controlee UWB device (e.g., the receiving UWB device) prior to the UWB session via secure means, such as Bluetooth or another OOB communication channel. Additionally or alternatively, the time offset information may be sent to a receiving UWB device by the transmitting UWB device during a UWB session via the RCM 615, for example.

The value of the time offset itself may be communicated in different ways, depending on desired functionality.

According to some embodiments, a time offset may be communicated as a length of time in nanoseconds (ns), symbols, or chips, for example. Additionally or alternatively, a time offset may be communicated in multiples of the Ranging Counter Time Unit (RTCU) which can be as low as 15.65 ps.

Depending on desired functionality, a time offset may be implemented in a variety of ways. As illustrated in FIG. 6, the offset may comprise offsetting the entire STS. Additionally or alternatively, as explained hereafter, a time offset may be applied to each pulse within an STS. Moreover, the time offset may be uniform for each STS in the series of STS packets 600 (e.g., $t_1 = t_2 = t_3$), or may vary from one STS to the next (e.g., (e.g., $t_1$, $t_2$, and $t_3$ are different, as illustrated in FIG. 6). When sharing the time offset information with a controlee UWB device, a controller UWB device may send the controlee UWB device the time offset itself (e.g., for all STS in the series of STS packets 600 or for each STS 610) or may send the controlee UWB device a key or seed value from which the receiving UWB device may determine a value for the time offset (again, for all STS in the series of STS packets 600, or for each STS 610) using a known algorithm, in a manner similar to the creation of STS itself.

FIG. 7 is a timing diagram 700 illustrating how a time offset may be performed at the pulse level, according to some embodiments. In FIG. 7, a series of bits 710 (e.g., in an STS) are shown as pulses 720, which are communicated between a transmitting UWB device and the receiving UWB device. Each pulse represents a corresponding bit, where (in this example) a positive pulse represents a "1" and a negative pulse represents a "0." As shown in the figure, each pulse has a pulse width, and a time gap separates the pulses to help mitigate any interference between pulses. For example, for a UWB transmission having a 500 MHz bandwidth, the pulse width would be 2 ns. In this example, the ratio of the duration of a time gap and a pulse width is approximately 3:1, although alternative embodiments may vary in these aspects.

According to some embodiments, in addition or as an alternative to a larger time offset shown in FIG. 6, a pulse-level time offset may be performed. That is, the time of each pulse (e.g., pulse time 730) may be offset (e.g., forward or backward in time as illustrated by arrow 740). Similar to the time offset described with respect to FIG. 6, the time offset may be the same for all pulses 720, or may be different, such that each individual pulse has its own respective time offset. According to some embodiments, time offsets may be on the order of a duration of a pulse or lower, such as 0.5, 0.25, or 0.125 of a pulse width. For a pulse with of 2 ns, for example, options may include one nanoseconds, 0.5 ns, or 0.25 ns. Other embodiments may have additional options for a time offset, which may include options that are longer or shorter in duration. The time offset for each pulse may be determined in a manner similar to the one previously described with regard to STS time offsets, using time offset information (e.g., a pseudo-random time offset generation strategy, a hopping pattern, etc.) known only to the UWB transmitter and receiver.

Although the previously-described embodiments apply to UWB ranging utilizing traditional STS packet configurations, embodiments are not so limited. For example, some embodiments may utilize time offsets with regard to narrowband (NB)-assisted ranging. An example of this is provided hereafter with regard to FIGS. 8A and 8B.

FIG. 8A is a timing diagram illustrating a series of NB UWB packets 800a that may be transmitted by a transmitting UWB device in an NB-assisted ranging session. As can be seen, the series of NB UWB packets 800a is similar to the series of STS packets 500 for UWB ranging shown in FIG. 5. Here, however, NB UWB packets correspond with only a portion of the complete STS packet configuration. After an initial NB packet 810 is used for timing and frequency synchronization estimation, and initial SYNC packet 820 is transmitted to obtain a more accurate estimate for the timing and frequency synchronization. Subsequently STS 830 may be transmitted to enable secure positioning.

Despite the use of STS 830, the series of NB UWB packets 800a used for NB-assisted ranging may be vulnerable to spoofing in a manner similar to those described previously with regard to UWB positioning using traditional STS packets. Blocks 840 and 850 illustrate times during the transmission of the series of UWB packets 800a at which an spoofer may inject a fraudulent transmission. A spoofer may perform Cicada++ or Adaptive Injection spoofing by transmitting at block 840, for example, after determining (e.g., from SYNC 820) when STS 830 will be transmitted. Additionally or alternatively, a spoofer may transmit a counterfeit SYNC at block 850, to alter transmission times 860 of the STS 830.

FIG. 8B is a timing diagram illustrating a series of NB UWB packets 800b, similar to FIG. 8A, but with time offsets $t_1$, $t_2$, and $t_3$. Here, time offsets may be implemented in a manner similar to previous embodiments, where time offsets $t_1$, $t_2$, and $t_3$ may be the same for the whole series of UWB NB packets 800b or may change from one STS to another. Similar to previously-described embodiments, time offsets are known to the UWB transmitter and receiver, and time offset information may be shared using in-band or OOB means as described herein. Depending on desired functionality, an STS may be offset sufficiently to avoid spoofing entirely (e.g., the duration of the offset is larger than the duration of expected spoofing), and/or may be offset at a pulse level, such that pulses of the STS are offset from pulses from any spoofing. It can be noted that, even if an spoofer is successful at spoofing the SYNC (as shown by the spoofing at block 870) and changes the expected (non-offset) transmission times 880 of the STS packets, the time offsets used in STS transmission can still mitigate the impact of any subsequent spoofing. This is because the spoofer is unaware of time offsets and will perform any subsequent spoofing at the expected transmission times 880, as altered by the spoofed SYNC.

Figure 9:
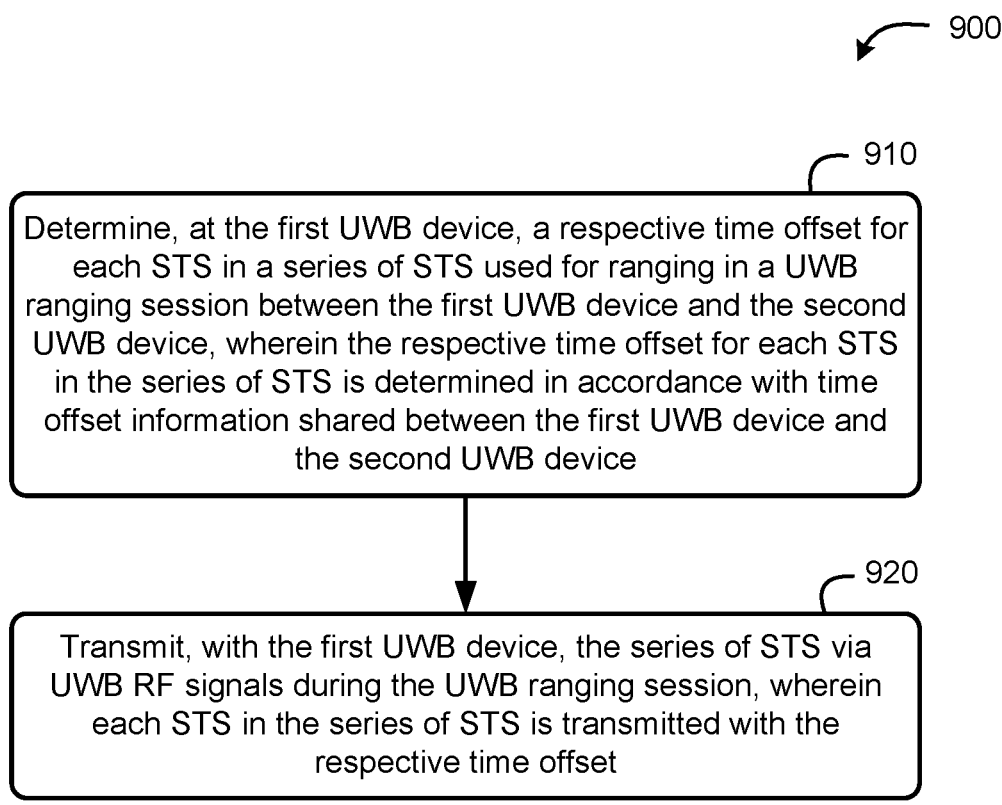
FIG. 9 is a flow diagram of a method of enabling secure UWB ranging between a first UWB device and a second UWB device, according to an embodiment.
Figure 11:
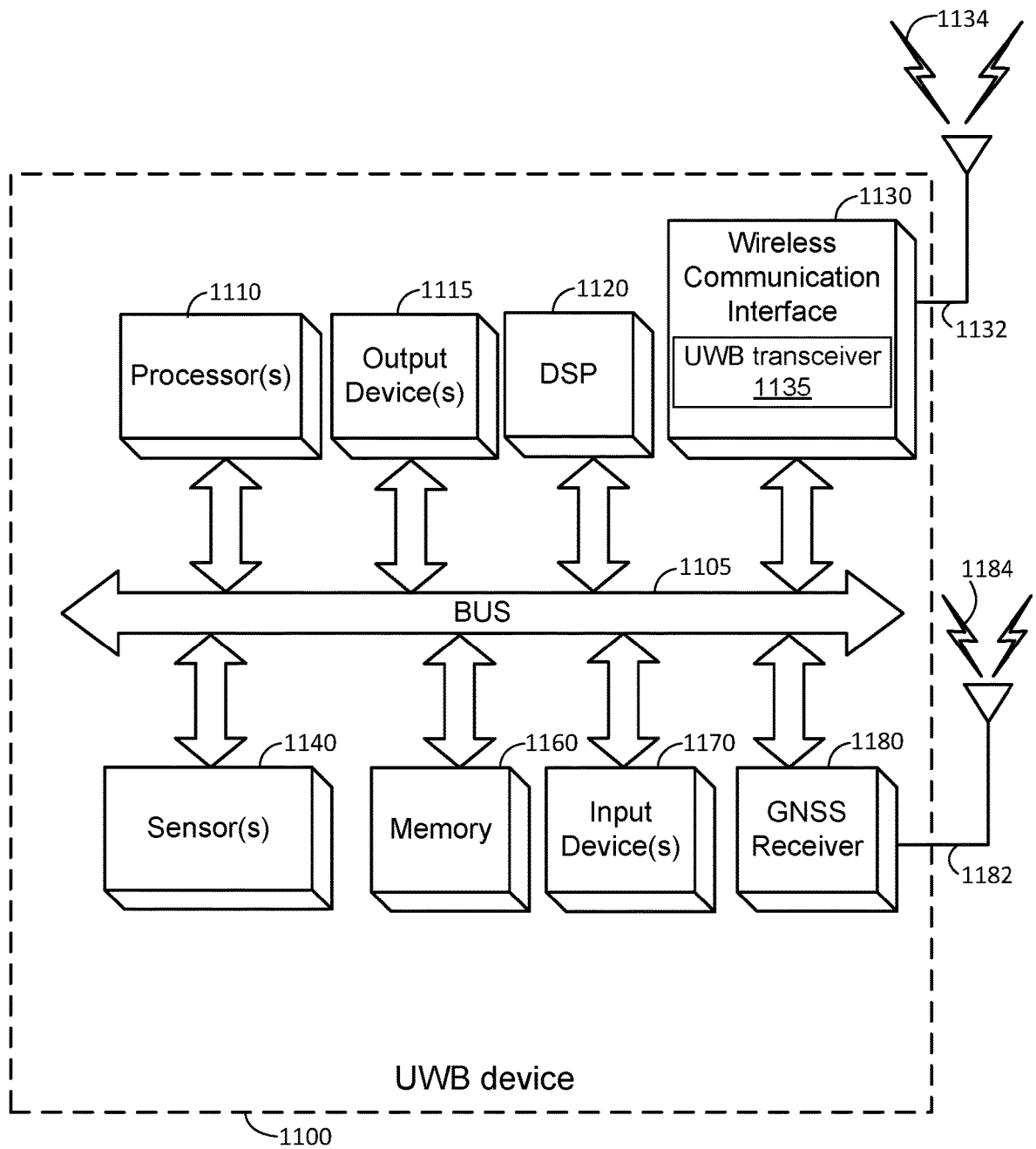
FIG. 11 is a block diagram of an embodiment of a UWB device.

FIG. 9 is a flow diagram of a method 900 of enabling secure UWB ranging between a first UWB device and a second UWB device, according to an embodiment. The functions illustrated in the blocks of FIG. 9 may be performed, for example, by a transmitting UWB device in a UWB ranging (positioning) session. Means for performing the functionality illustrated in one or more of the blocks shown in FIG. 9 may be performed by hardware and/or software components of a UE. Example components of a UE are illustrated in FIG. 11, which is described in more detail below.

At block 910, the functionality comprises determining, at the first UWB device, a respective time offset for each STS in a series of STS used for ranging in a UWB ranging session between the first UWB device and the second UWB device, wherein the respective time offset for each STS in the series of STS is determined in accordance with time offset information shared between the first UWB device and the second UWB device. As noted in the embodiments herein, such time offsets may be implemented in any of a variety of ways. For example, according to some embodiments, respective time offset is the same for each STS in the series of STS.

according to some embodiments, the respective time offset varies from one STS to another in the series of STS. As noted in embodiments as described elsewhere herein, time offset information may comprise a description of the length of time offsets (e.g., in terms of nanoseconds, chips, symbols, RTCUs, or any combination thereof). Additionally or alternatively, time offset information may comprise a seed or key for an algorithm both transmitting and receiving UWB devices may use to determine time offsets.

As noted herein, according to some embodiments, time offsets may be at the pulse level. As such, according to some embodiments of the method 900, the STS in the series of STS comprises a respective series of pulses, and wherein the respective time offset for each STS in the series of STS comprises a respective time offset for each pulse in the respective series of pulses. In such embodiments, the respective time offset for each pulse in the respective series of pulses may be less than or equal to a duration of a pulse in the respective series of pulses. Additionally or alternatively, the respective time offset for each pulse in the respective series of pulses varies from one pulse to another in the respective series of pulses, or may be the same for all pulses in the series.

Additionally or alternatively, some embodiments may employ one or more of the following features. For example, according to some embodiments, the time offset information may be shared between the first UWB device and the second UWB device prior to the UWB ranging session using non-UWB RF communication. Additionally or alternatively, the time offset information may be shared between the first UWB device and the second UWB device in a ranging control message (RCM) of the UWB ranging session. According to some embodiments, the UWB ranging session comprises a narrowband (NB) UWB ranging session.

Means for performing functionality at block 910 may comprise a bus 1105, processor(s) 1110, digital signal processor (DSP) 1120, wireless communication interface 1130 (including UWB transceiver 1135), memory 1160, and/or other components of a UE device 1100, as illustrated in FIG. 11 and described hereafter.

At block 920, the functionality comprises transmitting, with the first UWB device, the series of STS via UWB RF signals during the UWB ranging session, wherein each STS in the series of STS is transmitted with the respective time offset. Here, the series of STS may be included in a traditional STS packet configuration (e.g., as illustrated in FIG. 4A) if traditional UWB positioning is being performed. Additionally or alternatively, when NB-assisted positioning is being performed, the STS may not be part of a larger STS packet.

Means for performing functionality at block 920 may comprise a bus 1105, processor(s) 1110, digital signal processor (DSP) 1120, wireless communication interface 1130 (including UWB transceiver 1135), memory 1160, and/or other components of a UE device 1100, as illustrated in FIG. 11 and described hereafter.

Figure 10:
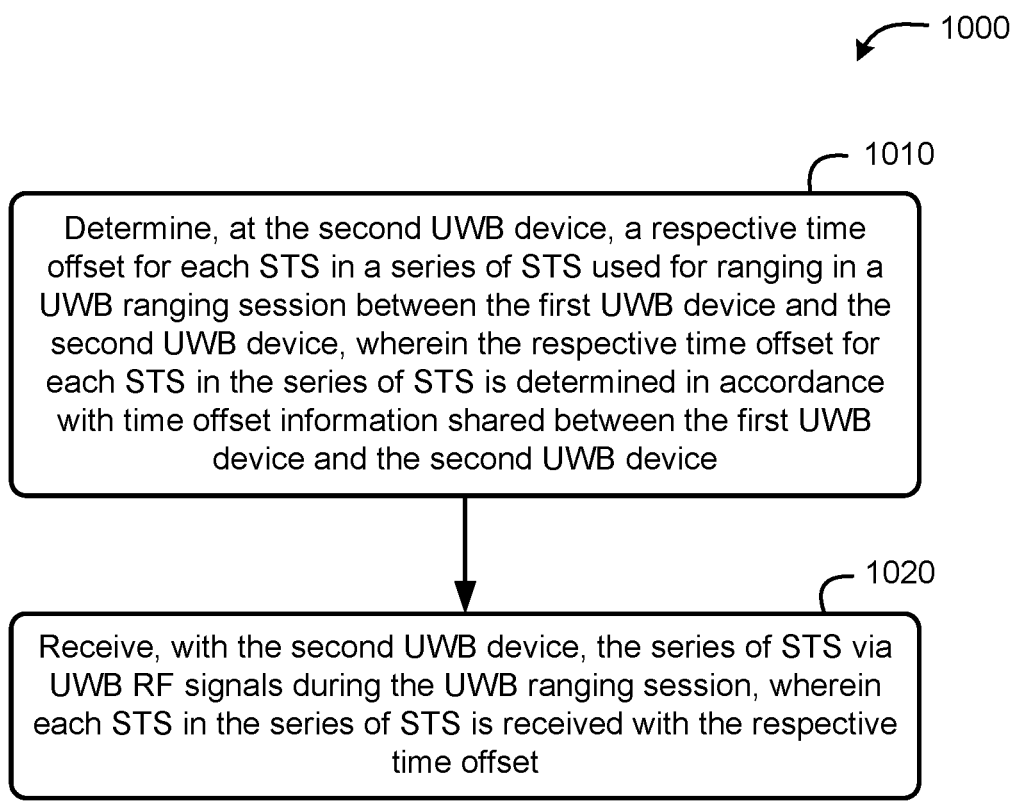
FIG. 10 is a flow diagram of another method of enabling secure UWB ranging between a first UWB device and a second UWB device, according to an embodiment.

FIG. 10 is a flow diagram of another method 1000 of enabling secure UWB ranging between a first UWB device and a second UWB device, according to an embodiment. The functions illustrated in the blocks of FIG. 10 may be performed, for example, by a receiving UWB device in a UWB ranging (positioning) session. Means for performing the functionality illustrated in one or more of the blocks shown in FIG. 10 may be performed by hardware and/or software components of a UE. Example components of a UE are illustrated in FIG. 11, which is described in more detail below.

At block 1010, the functionality comprises determining, at the second UWB device, a respective time offset for each STS in a series of STS used for ranging in a UWB ranging session between the first UWB device and the second UWB device, wherein the respective time offset for each STS in the series of STS is determined in accordance with time offset information shared between the first UWB device and the second UWB device. Again, as noted in the embodiments herein, such time offsets may be implemented in any of a variety of ways. For example, according to some embodiments, respective time offset is the same for each STS in the series of STS. according to some embodiments, the respective time offset varies from one STS to another in the series of STS. As noted in embodiments as described elsewhere herein, time offset information may comprise a description of the length of time offsets (e.g., in terms of nanoseconds, chips, symbols, RTCUs, or any combination thereof). Additionally or alternatively, time offset information may comprise a seed or key for an algorithm both transmitting and receiving UWB devices may use to determine time offsets.

As noted herein, according to some embodiments, time offsets may be at the pulse level. As such, according to some embodiments of the method 1000, the STS in the series of STS comprises a respective series of pulses, and wherein the respective time offset for each STS in the series of STS comprises a respective time offset for each pulse in the respective series of pulses. In such embodiments, the respective time offset for each pulse in the respective series of pulses may be less than or equal to a duration of a pulse in the respective series of pulses. Additionally or alternatively, the respective time offset for each pulse in the respective series of pulses varies from one pulse to another in the respective series of pulses, or may be the same for all pulses in the series.

Additionally or alternatively, some embodiments may employ one or more of the following features. For example, according to some embodiments, the time offset information may be shared between the first UWB device and the second UWB device prior to the UWB ranging session using non-UWB RF communication. Additionally or alternatively, the time offset information may be shared between the first UWB device and the second UWB device in a ranging control message (RCM) of the UWB ranging session. According to some embodiments, the UWB ranging session comprises a narrowband (NB) UWB ranging session.

Means for performing functionality at block 1010 may comprise a bus 1105, processor(s) 1110, digital signal processor (DSP) 1120, wireless communication interface 1130 (including UWB transceiver 1135), memory 1160, and/or other components of a UE device 1100, as illustrated in FIG. 11 and described hereafter.

At block 1020, the functionality comprises transmitting, with the first UWB device, the series of STS via UWB RF signals during the UWB ranging session, wherein each STS in the series of STS is transmitted with the respective time offset. Here, the series of STS may be included in a traditional STS packet configuration (e.g., as illustrated in FIG. 4A) if traditional UWB positioning is being performed. Additionally or alternatively, when NB-assisted positioning is being performed, the STS may not be part of a larger STS packet.

Means for performing functionality at block 1020 may comprise a bus 1105, processor(s) 1110, digital signal processor (DSP) 1120, wireless communication interface 1130

(including UWB transceiver 1135), memory 1160, and/or other components of a UE device 1100, as illustrated in FIG. 11 and described hereafter.

FIG. 11 is a block diagram of an embodiment of a UWB device 1100 which can be utilized as described herein, including a UWB transmitter, receiver, initiator, responder, controller, controlee, or any combination thereof. It should be noted that FIG. 11 is meant only to provide a generalized illustration of various components, any or all of which may be utilized as appropriate. For example, more basic/simple types of UWB devices may omit various components that may be included in more advanced/complex UWB devices. Mobile UWB devices may include some components that are not in stationary UWB devices (e.g., Global Navigation Satellite System (GNSS) receiver 1180), and vice-versa. Furthermore, as previously noted, the functionality of the UE discussed in the previously described embodiments may be executed by one or more of the hardware and/or software components illustrated in FIG. 11.

The mobile UWB device 1100 is shown comprising hardware elements that can be electrically coupled via a bus 1105 (or may otherwise be in communication, as appropriate). The hardware elements may include processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The mobile UWB device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile UWB device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1100 to communicate with other devices as described herein. The wireless communication interface 1130 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

As illustrated, the wireless communication interface 1130 may further comprise a UWB transceiver 1135. The UWB transceiver 1135 may be operated to perform the UWB operations described herein, and/or may implement functions shown by UWB hardware and/or software components previously described (e.g., with respect to FIG. 8). Further, the wireless communications interface 1130 may comprise one or more additional communication technologies with which any OOB functionalities described herein may be performed. According to some embodiments, the UWB transceiver 1135 may be one of a plurality of UWB transceivers of the mobile UWB device 1100. Further, the UWB transceiver may be used for functionality in addition to the UWB ranging or positioning functionality described herein. Although illustrated as part of the wireless communication interface 1130, the UWB transceiver 1135 may be separate from the wireless communication interface 1130 in some embodiments.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the UWB device 1100 using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1180 can be used with various + storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile UWB device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile UWB device 1100 (and/or processor(s) 1110 or DSP 1120 within mobile UWB device 1100). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling secure ultra-wideband (UWB) ranging between a first UWB device and a second UWB device, the method comprising: determining, at the first UWB device, a respective time offset for each scrambled timestamp sequence (STS) in a series of STS used for ranging in a UWB ranging session between the first UWB device and the second UWB device, wherein the respective time offset for each STS in the series of STS is determined in accordance with time offset information shared between the first UWB device and the second UWB device; and transmitting, with the first UWB device, the series of STS via UWB radio frequency (RF) signals during the UWB ranging session, wherein each STS in the series of STS is transmitted with the respective time offset.

Clause 2. The method of clause 1, wherein the respective time offset is the same for each STS in the series of STS.

Clause 3. The method of clause 1, wherein the respective time offset varies from one STS to another in the series of STS.

Clause 4. The method of clause 1, wherein each STS in the series of STS comprises a respective series of pulses, and wherein the respective time offset for each STS in the series of STS comprises a respective time offset for each pulse in the respective series of pulses.

Clause 5. The method of clause 4 wherein the respective time offset for each pulse in the respective series of pulses is less than or equal to a duration of a pulse in the respective series of pulses.

Clause 6. The method of any one of clauses 4-5 wherein the respective time offset for each pulse in the respective series of pulses varies from one pulse to another in the respective series of pulses.

Clause 7. The method of any one of clauses 1-6 wherein the time offset information is shared between the first UWB device and the second UWB device prior to the UWB ranging session using non-UWB RF communication.

Clause 8. The method of any one of clauses 1-7 wherein the time offset information is shared between the first UWB device and the second UWB device in a ranging control message (RCM) of the UWB ranging session.

Clause 9. The method of any one of clauses 1-8 wherein the UWB ranging session comprises a narrowband (NB) UWB ranging session.

Clause 10. A method of enabling secure ultra-wideband (UWB) ranging between a first UWB device and a second UWB device, the method comprising: determining, at the second UWB device, a respective time offset for each scrambled timestamp sequence (STS) in a series of STS used for ranging in a UWB ranging session between the first UWB device and the second UWB device, wherein the respective time offset for each STS in the series of STS is determined in accordance with time offset information shared between the first UWB device and the second UWB device; and receiving, with the second UWB device, the series of STS via UWB radio frequency (RF) signals during the UWB ranging session, wherein each STS in the series of STS is received with the respective time offset.

Clause 11. The method of clause 10, wherein the respective time offset is the same for each STS in the series of STS.

Clause 12. The method of clause 10, wherein the respective time offset varies from one STS to another in the series of STS.

Clause 13. The method of clause 10, wherein each STS in the series of STS comprises a respective series of pulses, and wherein the respective time offset for each STS in the series of STS comprises a respective time offset for each pulse in the respective series of pulses.

Clause 14. The method of clause 13 wherein the respective time offset for each pulse in the respective series of pulses is less than or equal to a duration of a pulse in the respective series of pulses.

Clause 15. The method of any one of clauses 13-14 wherein the respective time offset for each pulse in the respective series of pulses varies from one pulse to another in the respective series of pulses.

Clause 16. The method of any one of clauses 10-15 wherein the time offset information is shared between the first UWB device and the second UWB device prior to the UWB ranging session using non-UWB RF communication.

Clause 17. The method of any one of clauses 10-16 wherein the time offset information is shared between the first UWB device and the second UWB device in a ranging control message (RCM) of the UWB ranging session.

Clause 18. The method of any one of clauses 10-17 wherein the UWB ranging session comprises a narrowband (NB) UWB ranging session.

Clause 19. A first ultra-wideband (UWB) device, comprising: a transceiver; a memory; and one or more processors communicatively coupled with the transceiver and the memory, wherein the one or more processors are configured to: determine a respective time offset for each scrambled timestamp sequence (STS) in a series of STS used for ranging in a UWB ranging session between the first UWB device and a second UWB device, wherein the respective time offset for each STS in the series of STS is determined in accordance with time offset information shared between the first UWB device and the second UWB device; and transmit, via the transceiver, the series of STS via UWB radio frequency (RF) signals during the UWB ranging session, wherein each STS in the series of STS is transmitted with the respective time offset.

Clause 20. The first UWB device of clause 19, wherein the one or more processors are configured to determine the respective time offset such that: (i) the respective time offset is the same for each STS in the series of STS, or (ii) the respective time offset varies from one STS to another in the series of STS.

Clause 21. The first UWB device of clause 19, wherein the one or more processors are configured to determine the respective time offset such that each STS in the series of STS comprises a respective series of pulses, and wherein the respective time offset for each STS in the series of STS comprises a respective time offset for each pulse in the respective series of pulses.

Clause 22. The first UWB device of clause 19, wherein the one or more processors are configured to determine the respective time offset such that the respective time offset for each pulse in the respective series of pulses is less than or equal to a duration of a pulse in the respective series of pulses.

Clause 23. The first UWB device of any one of clauses 19-22 wherein the one or more processors are further configured to share the time offset information between the first UWB device and the second UWB device prior to the UWB ranging session using non-UWB RF communication.

Clause 24. The first UWB device of any one of clauses 19-23 wherein the one or more processors are further configured to share the time offset information between the first UWB device and the second UWB device in a ranging control message (RCM) of the UWB ranging session.

Clause 25. The first UWB device of any one of clauses 19-24 wherein the UWB ranging session comprises a narrowband (NB) UWB ranging session.

Clause 26. A second ultra-wideband (UWB) device, comprising: a transceiver; a memory; and one or more processors communicatively coupled with the transceiver and the memory, wherein the one or more processors are configured to: determine a respective time offset for each scrambled timestamp sequence (STS) in a series of STS used for ranging in a UWB ranging session between a first UWB device and the second UWB device, wherein the respective time offset for each STS in the series of STS is determined in accordance with time offset information shared between the first UWB device and the second UWB device; and receive, via the transceiver, the series of STS via UWB radio frequency (RF) signals during the UWB ranging session, wherein each STS in the series of STS is received with the respective time offset.

Clause 27. The second UWB device of clause 26, wherein the one or more processors are configured to determine the respective time offset such that: (i) the respective time offset is the same for each STS in the series of STS, or (ii) the respective time offset varies from one STS to another in the series of STS.

Clause 28. The second UWB device of clause 26, wherein the one or more processors are configured to determine the respective time offset such that each STS in the series of STS comprises a respective series of pulses, and wherein the respective time offset for each STS in the series of STS comprises a respective time offset for each pulse in the respective series of pulses.

Clause 29. The second UWB device of any one of clauses 26-28 wherein the time offset information is shared between the first UWB device and the second UWB device: (i) prior to the UWB ranging session using non-UWB RF communication, or (ii) in a ranging control message (RCM) of the UWB ranging session.

Clause 30. The second UWB device of any one of clauses 26-29 wherein the UWB ranging session comprises a narrowband (NB) UWB ranging session.

Clause 31. An apparatus having means for performing the method of any one of clauses 1-18.

Clause 32. A non-transitory computer-readable medium storing instructions, the instructions comprising code for performing the method of any one of clauses 1-18.

What is claimed is:

1. A method of enabling secure ultra-wideband (UWB) ranging between a first UWB device and a second UWB device, the method comprising:
   determining, at the first UWB device, a respective time offset for each scrambled timestamp sequence (STS) in a series of STS used for ranging in a UWB ranging session between the first UWB device and the second UWB device, wherein the respective time offset for each STS in the series of STS:
      varies from one STS to another in the series of STS,
      is determined in accordance with time offset information shared between the first UWB device and the second UWB device using an in-band or out-of-band (OOB) link, and
      comprises a change to a transmission time of the each STS in the series of STS from an expected transmission time; and
   transmitting, with the first UWB device, the series of STS via UWB radio frequency (RF) signals during the UWB ranging session, wherein each STS in the series of STS is transmitted with the respective time offset.

2. The method of claim 1, wherein each STS in the series of STS comprises a respective series of pulses, and wherein the respective time offset for each STS in the series of STS comprises a respective time offset for each pulse in the respective series of pulses.

3. The method of claim 2, wherein the respective time offset for each pulse in the respective series of pulses is less than or equal to a duration of a pulse in the respective series of pulses.

4. The method of claim 2, wherein the respective time offset for each pulse in the respective series of pulses varies from one pulse to another in the respective series of pulses.

5. The method of claim 1, wherein the time offset information is shared between the first UWB device and the second UWB device prior to the UWB ranging session using non-UWB RF communication.

6. The method of claim 1, wherein the time offset information is shared between the first UWB device and the second UWB device in a ranging control message (RCM) of the UWB ranging session.

7. The method of claim 1, wherein the UWB ranging session comprises a narrowband (NB) UWB ranging session.

8. A method of enabling secure ultra-wideband (UWB) ranging between a first UWB device and a second UWB device, the method comprising:
   determining, at the second UWB device, a respective time offset for each scrambled timestamp sequence (STS) in a series of STS used for ranging in a UWB ranging session between the first UWB device and the second UWB device, wherein the respective time offset for each STS in the series of STS:
      varies from one STS to another in the series of STS,
      is determined in accordance with time offset information shared between the first UWB device and the second UWB device using an in-band or out-of-band (OOB) link, and
      comprises a change to a transmission time of the each STS in the series of STS from an expected transmission time; and
   receiving, with the second UWB device, the series of STS via UWB radio frequency (RF) signals during the UWB ranging session, wherein each STS in the series of STS is received with the respective time offset.

9. The method of claim 8, wherein each STS in the series of STS comprises a respective series of pulses, and wherein the respective time offset for each STS in the series of STS comprises a respective time offset for each pulse in the respective series of pulses.

10. The method of claim 9, wherein the respective time offset for each pulse in the respective series of pulses is less than or equal to a duration of a pulse in the respective series of pulses.

11. The method of claim 9, wherein the respective time offset for each pulse in the respective series of pulses varies from one pulse to another in the respective series of pulses.

12. The method of claim 8, wherein the time offset information is shared between the first UWB device and the second UWB device prior to the UWB ranging session using non-UWB RF communication.

13. The method of claim 8, wherein the time offset information is shared between the first UWB device and the second UWB device in a ranging control message (RCM) of the UWB ranging session.

14. The method of claim 8, wherein the UWB ranging session comprises a narrowband (NB) UWB ranging session.

15. A first ultra-wideband (UWB) device, comprising:
   a transceiver;
   a memory; and
   one or more processors communicatively coupled with the transceiver and the memory, wherein the one or more processors are configured to:
      determine a respective time offset for each scrambled timestamp sequence (STS) in a series of STS used for ranging in a UWB ranging session between the first UWB device and a second UWB device, wherein the respective time offset for each STS in the series of STS:

varies from one STS to another in the series of STS, is determined in accordance with time offset information shared between the first UWB device and the second UWB device using an in-band or out-of-band (OOB) link, and comprises a change to a transmission time of the each STS in the series of STS from an expected transmission time; and transmit, via the transceiver, the series of STS via UWB radio frequency (RF) signals during the UWB ranging session, wherein each STS in the series of STS is transmitted with the respective time offset.

16. The first UWB device of claim 15, wherein the one or more processors are configured to determine the respective time offset such that each STS in the series of STS comprises a respective series of pulses, and wherein the respective time offset for each STS in the series of STS comprises a respective time offset for each pulse in the respective series of pulses.

17. The first UWB device of claim 16, wherein the one or more processors are configured to determine the respective time offset such that the respective time offset for each pulse in the respective series of pulses is less than or equal to a duration of a pulse in the respective series of pulses.

18. The first UWB device of claim 15, wherein the one or more processors are further configured to share the time offset information between the first UWB device and the second UWB device prior to the UWB ranging session using non-UWB RF communication.

19. The first UWB device of claim 15, wherein the one or more processors are further configured to share the time offset information between the first UWB device and the second UWB device in a ranging control message (RCM) of the UWB ranging session.

20. The first UWB device of claim 15, wherein the UWB ranging session comprises a narrowband (NB) UWB ranging session.

21. A second ultra-wideband (UWB) device, comprising:
a transceiver;
a memory; and
one or more processors communicatively coupled with the transceiver and the memory, wherein the one or more processors are configured to:
determine a respective time offset for each scrambled timestamp sequence (STS) in a series of STS used for ranging in a UWB ranging session between a first UWB device and the second UWB device, wherein the respective time offset for each STS in the series of STS:
varies from one STS to another in the series of STS,
is determined in accordance with time offset information shared between the first UWB device and the second UWB device using an in-band or out-of-band (OOB) link, and
comprises a change to a transmission time of the each STS in the series of STS from an expected transmission time; and
receive, via the transceiver, the series of STS via UWB radio frequency (RF) signals during the UWB ranging session, wherein each STS in the series of STS is received with the respective time offset.

22. The second UWB device of claim 21, wherein the one or more processors are configured to determine the respective time offset such that each STS in the series of STS comprises a respective series of pulses, and wherein the respective time offset for each STS in the series of STS comprises a respective time offset for each pulse in the respective series of pulses.

23. The second UWB device of claim 21, wherein the time offset information is shared between the first UWB device and the second UWB device: (i) prior to the UWB ranging session using non-UWB RF communication, or (ii) in a ranging control message (RCM) of the UWB ranging session.

24. The second UWB device of claim 21, wherein the UWB ranging session comprises a narrowband (NB) UWB ranging session.

* * * * *